(12) United States Patent
Wright et al.

(10) Patent No.: US 7,058,181 B2
(45) Date of Patent: Jun. 6, 2006

(54) WIRELESS BRIDGE FOR ROAMING IN NETWORK ENVIRONMENT

(75) Inventors: Michael D. Wright, Sandy, UT (US); Douglas LaVell Hale, Orem, UT (US); Anthony Alan Jeffree, Cheshire (GB); Peter Kendrick Boucher, Orem, UT (US)

(73) Assignee: Senforce Technologies, Inc., Draper, UT (US)

(*) Notice: Subject to any disclaimer, the term of this patent is extended or adjusted under 35 U.S.C. 154(b) by 1002 days.

(21) Appl. No.: 09/922,429

(22) Filed: Aug. 2, 2001

(65) Prior Publication Data

US 2003/0026426 A1 Feb. 6, 2003

(51) Int. Cl.
*H04L 9/00* (2006.01)
*H04L 1/00* (2006.01)

(52) U.S. Cl. .................... 380/270; 713/153; 455/410; 370/913

(58) Field of Classification Search .............. 380/270; 713/183, 153; 709/238; 455/422.1, 428, 455/433, 432.1, 435.1, 410–411; 370/400–401, 370/913
See application file for complete search history.

(56) References Cited

U.S. PATENT DOCUMENTS

| | | | | |
|---|---|---|---|---|
| RE36,946 E | * | 11/2000 | Diffie et al. ............... | 380/278 |
| 6,195,705 B1 | * | 2/2001 | Leung ....................... | 709/245 |
| 6,567,664 B1 | * | 5/2003 | Bergenwall et al. ........ | 455/403 |
| 6,879,690 B1 | * | 4/2005 | Faccin et al. ............... | 380/247 |

OTHER PUBLICATIONS

Vijay Varadharajan, Security Enhanced Mobile Agents, 2000, ACM Conference on Computer and Communications Security, Athens, Greece, pp. 200-209.*
Comer, Douglas E., Internetworking with TCP/IP Principles, Protocols, and Architectures, 4th Ed., vol. 1, pp. 384-385.
Perkins, C. "IP Mobility Support," IBM Network Working Group, Oct. 1996, pp. 1-79.
Notification of Transmittal of the International Search Report, PCT/US02/22965, Feb. 5, 2003, 7 pages.

* cited by examiner

*Primary Examiner*—Matthew Smithers
*Assistant Examiner*—Minh Dieu Nguyen
(74) *Attorney, Agent, or Firm*—Fenwick & West LLP (57) ABSTRACT

The method for roaming in a network environment utilizes a token created by a first bridge device. The token comprises an identity of a context associated with the mobile device. The first bridge device creates the token and securely provides it to the mobile device. When the mobile device roams to a second bridge device in the network, the token is securely provided to the second bridge device. The second bridge device uses the token to establish to the first bridge device that it is a genuine agent of the mobile device. Once the first bridge authenticates the second bridge device's authority, it securely sends the context associated with the mobile device to the second bridge device. The second bridge device uses the context to properly connect the mobile device to the network. In this manner, secure roaming within a bridged network is provided.

29 Claims, 5 Drawing Sheets

FIG. 4 (con't)

WIRELESS BRIDGE FOR ROAMING IN NETWORK ENVIRONMENT

FIELD OF THE INVENTION

The present invention relates to local area networks, and more particularly to roaming within local area networks.

BACKGROUND OF THE INVENTION

Figure 1:
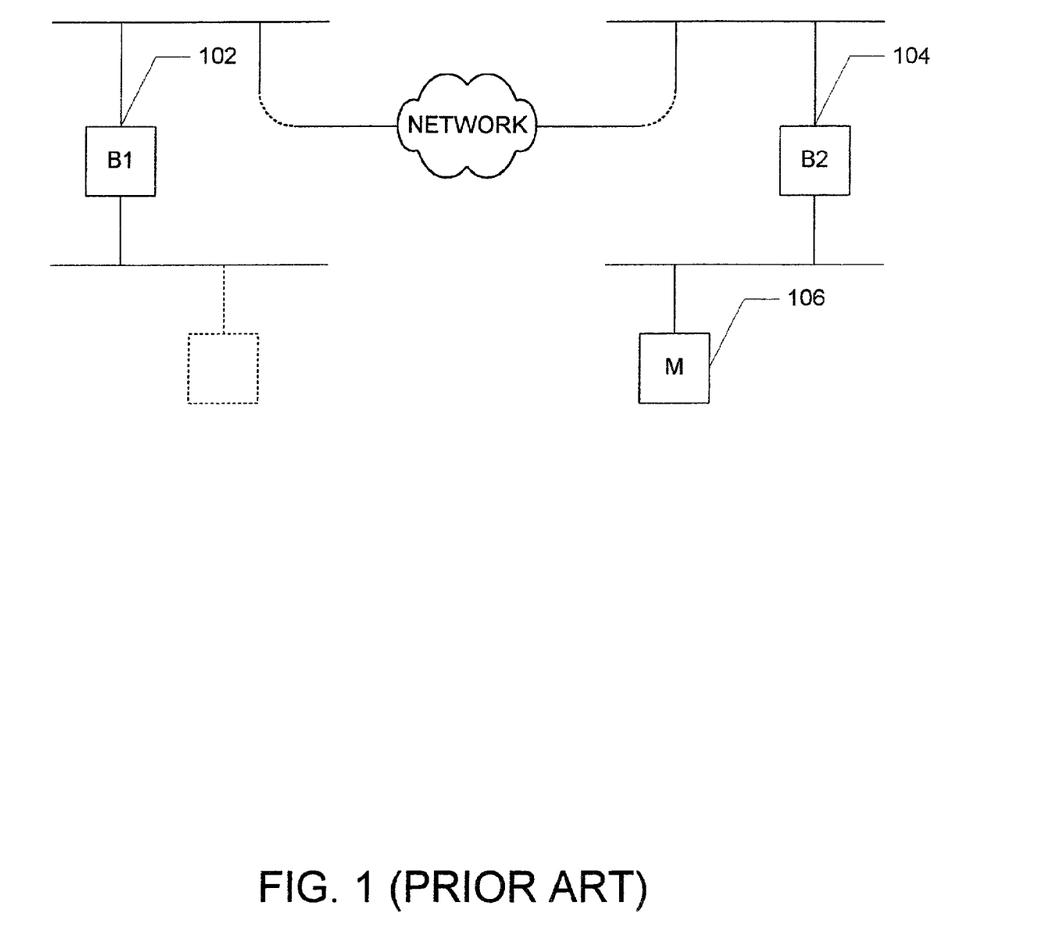
FIG. 1 illustrates a conventional local area network (LAN).

FIG. 1 illustrates a conventional local area network (LAN). The LAN comprises a first bridge device 102, a second bridge device 104, and a mobile device 106 within the same bridging domain. The mobile device 106 can move from a connection with the first bridge device 102 at a first location in the network to a connection with the second bridge device 104 at a second location in the network. For example, the mobile device 106 can be a laptop computer. When at his original office location, a user connects the mobile device 106 to the LAN via the first bridge device 102. When the user moves to a new office, the mobile device 106 is connected to the LAN via the second bridge device 104. Existing standards, such as 802.1W, 802.1Q, and 802.1X, defined how this move is handled. Under these standards, the Media Access Layer (MAC) address of the mobile device 106 is maintained even as the it moves from the first 102 to the second 104 bridging devices. Because the MAC address of the mobile device 106 is maintained from the first location to the second location, the other devices in the network do not realize that the mobile device 106 has changed physical location. However, the routing of packets between the mobile device 106 and the network must be changed to ensure that packets are routed to the proper physical location. This is done through a "context" associated with the mobile device 106, which is created by the first bridge device 102 when the mobile device 106 is connected to it.

The context comprises information such as the identity of the mobile device 106, how to maintain the status of a port to which the mobile device 106 is connected, the identity of the virtual LAN to which the mobile device 106 is connected, and how to return packets from the mobile device 106 to various locations throughout the LAN. Because the MAC address of the mobile device 106 is maintained within the same bridged domain under the standard, in order to ensure that packets are still properly routed to the mobile device 106 after it moves to the second bridge device 104, the context is transferred from the first bridge device 102 to the second bridge device 104. However, the context is typically transferred out-of-band, unsecurely, via a third party administrator. This conventional method of transferring the context creates a particularly significant security problem when the LAN is a wireless network because of the increased ease in interception and interjection of packets. Also, the conventional method is inefficient and cumbersome when a mobile device changes locations frequently, such as may be desirable for a wireless network.

Accordingly, there exists a need for an improved method for roaming in a network environment. The present invention addresses such a need.

SUMMARY OF THE INVENTION

The method for roaming in a network environment utilizes a token created by a first bridge device. The token comprises an identity of a context associated with the mobile device. The first bridge device creates the token and securely provides it to the mobile device. When the mobile device roams to a second bridge device in the network, the token is securely provided to the second bridge device. The second bridge device uses the token to establish to the first bridge device that it is a genuine agent of the mobile device. Once the first bridge authenticates the second bridge device's authority, it securely sends the context associated with the mobile device to the second bridge device. The second bridge device uses the context to properly connect the mobile device to the network. In this manner, secure roaming within a bridged network is provided.

DETAILED DESCRIPTION

The present invention provides an improved method for roaming in a network environment. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method in accordance with the present invention utilizes a "token" created by a first bridge device in the network. The token comprises an identity of a context associated with the mobile device when the mobile device is connected to the network through the first bridge device. The first bridge device creates the token and securely provides it to the mobile device. When the mobile device roams to a new location in the network comprising a second bridge device, the token is securely provided to the second bridge device. The second bridge device uses the token to establish to the first bridge device that it is a genuine agent of the mobile device. Once the first bridge authenticates the second bridge device's authority, it securely sends the context associated with the mobile device to the second bridge device. The second bridge device uses the context to properly connect the mobile device to the network at its new location.

To more particularly describe the features of the present invention, please refer to FIGS. 2 through 4 in conjunction with the discussion below.

Figure 2:
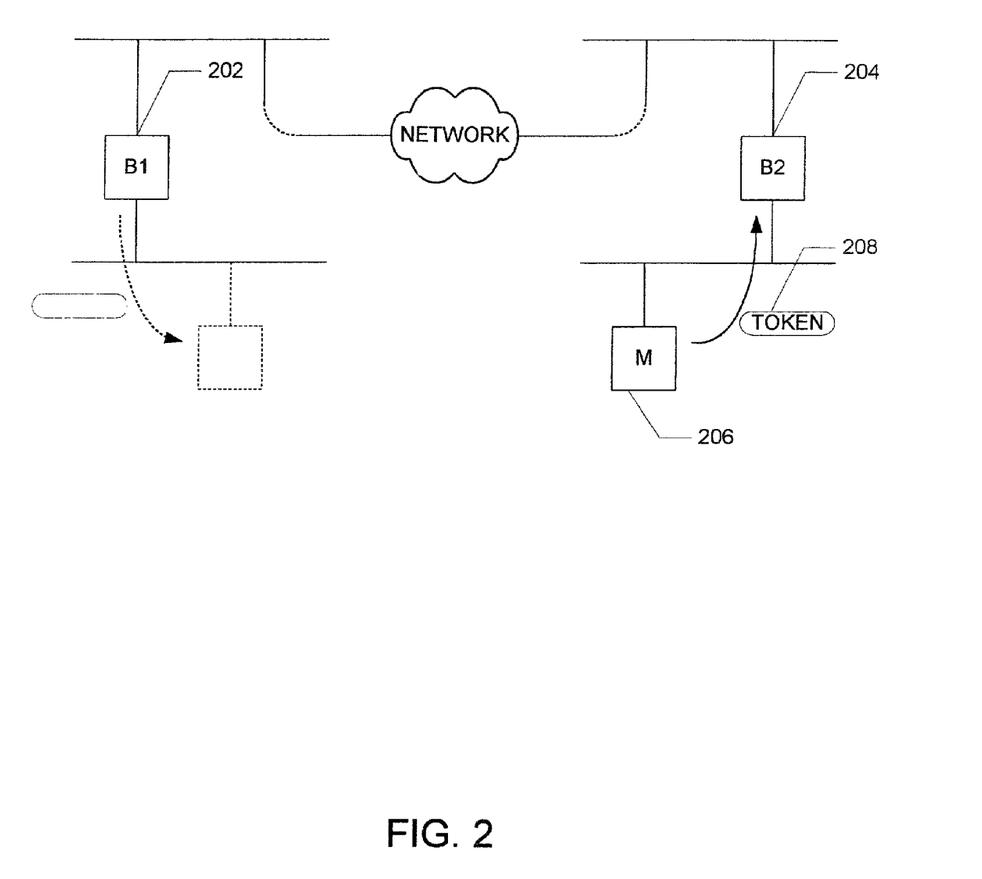
FIG. 2 illustrates a preferred embodiment of a network environment in accordance with the present invention.

FIG. 2 illustrates a preferred embodiment of a network environment in accordance with the present invention. The network comprises a first bridge device 202 at a first location in the network, a second bridge device 204 at a second location, and a mobile device 206 which roams from the first bridge device 102 to the second bridge device 104. The mobile device 206 is originally connected to the network through the first bridge device 202. The mobile device 206 then roams to the second location and attempts to connect to the network through the second bridge device 204. In the preferred embodiment, the first 202 and the second 204 bridge devices are within the same bridged network. The preferred embodiment utilizes a token 208 which comprises an identity of a context associated with the mobile device.

Figure 3:
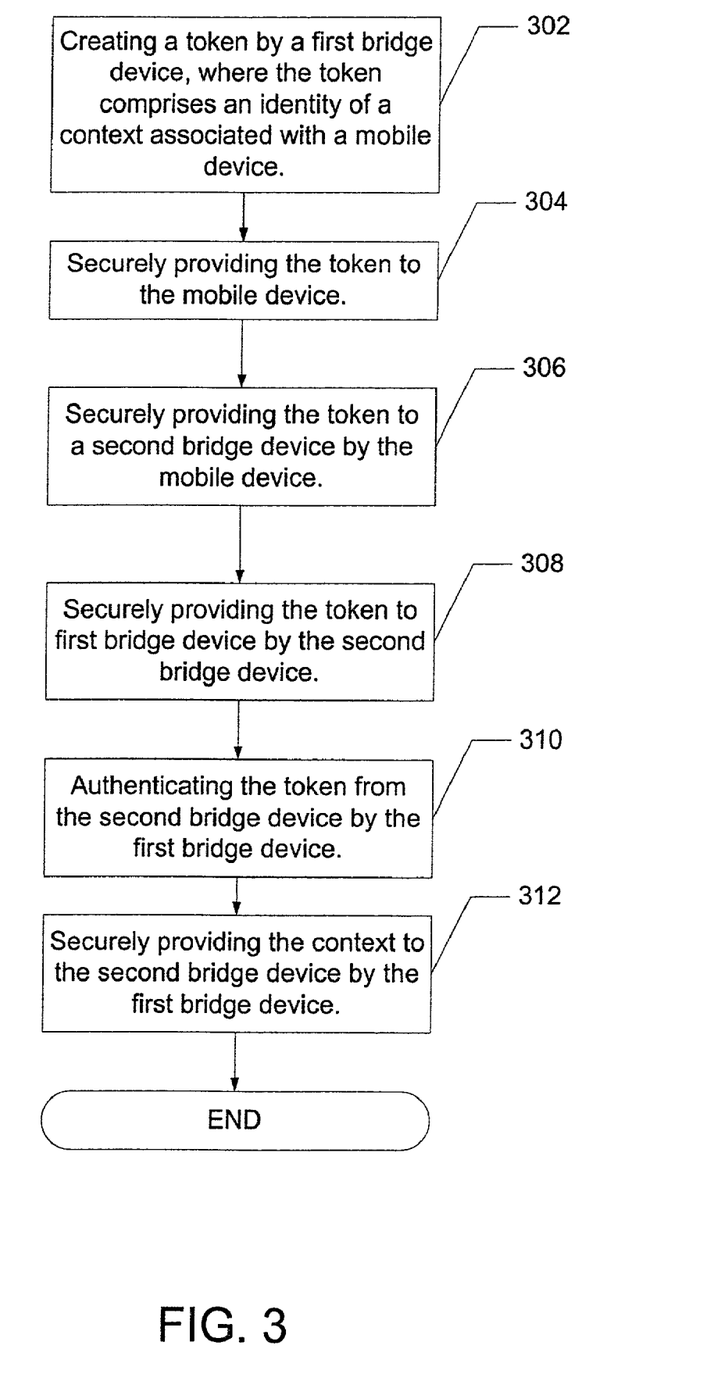
FIG. 3 is a flowchart illustrating a preferred embodiment of a method for roaming in a network environment.

FIG. 3 is a flowchart illustrating a preferred embodiment of a method for roaming in a network environment. First, the first bridge device 202 creates the token 208, via step 302. The token 208 is securely provided to the mobile device 206 by the first bridge device 202, via step 304. When the mobile device 206 roams and attempts to connect to the network through the second bridge device 204, the mobile device 206 securely provides the token 208 to the second bridge device 204, via step 306. By providing the token 208, the mobile device 206 gives the second bridge device 204 authority to act as its agent. The second bridge device 204 securely provides the token 208 to the first bridge device 202, via step 308, either directly or through at least one intermediary device (not shown). The first bridge device 202 authenticates the token 208 from the second bridge device 204, via step 310, to ensure that the token 208 is the one it original gave to the mobile device 206. Once the token 208 is authenticated, the context is securely provided by the first bridge device 202 to the second bridge device 204, via step 312, either directly or through at least one intermediary device. In this manner, secure roaming in a network environment is provided. The security is sufficient to support wireless roaming, where the mobile device 206 can frequently change locations.

"Security", as used in this specification, refers to the combination of secrecy and integrity. Secrecy refers to the ability to prevent an unauthorized party from obtaining data, even if a message containing the data is intercepted. Integrity refers to the ability to ensure that the content of the data is untampered. To be secure, a method should provide both secrecy and integrity.

Figure 4:
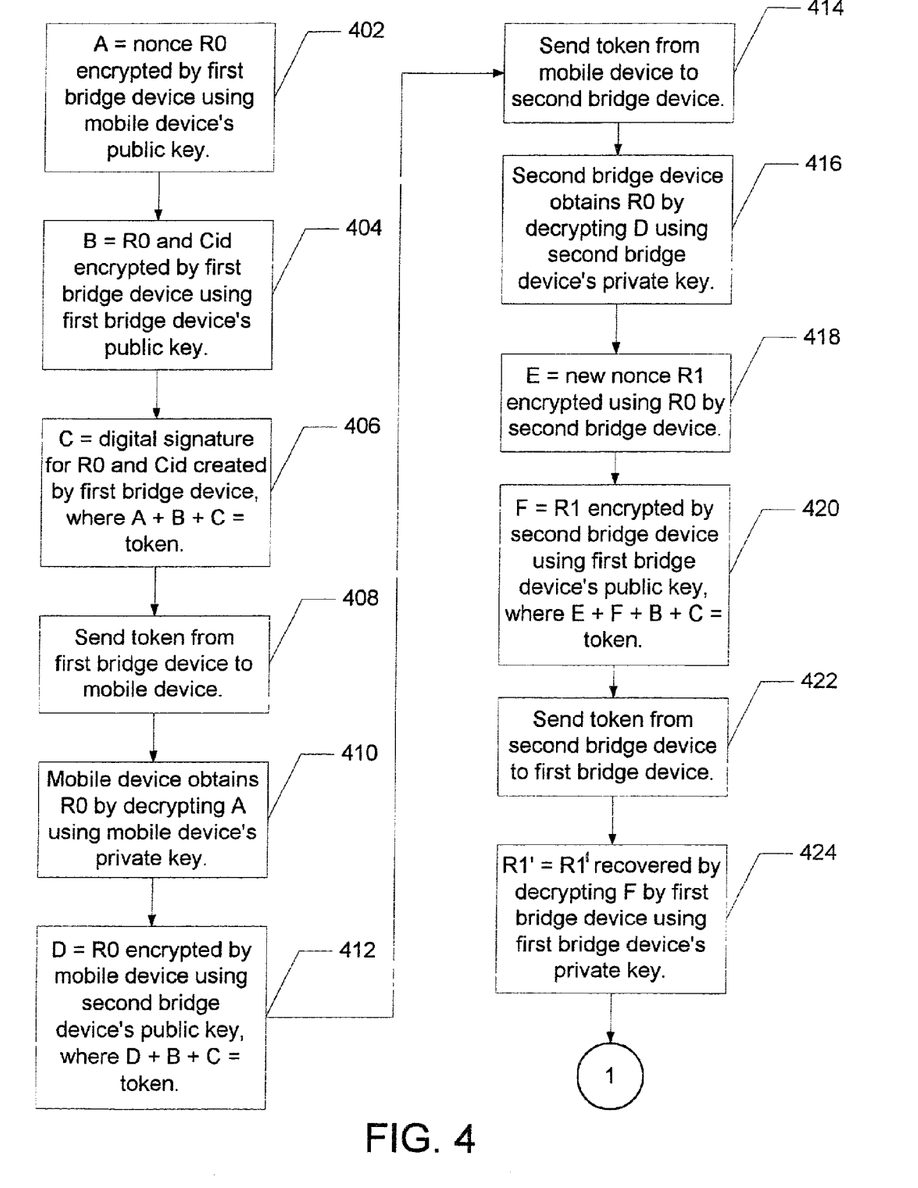
FIG. 4 is a flowchart illustrating an example implementation of the preferred embodiment of the method for roaming in a network environment in accordance with the present invention.

FIG. 4 is a flowchart illustrating an example implementation of the preferred embodiment of the method for roaming in a network environment in accordance with the present invention. In this implementation, the first bridge device 202, the second bridge device 204, and the mobile device 206 are each assigned their own public key/private key pairs. Public key/private key pairs, as used in cryptography, are well known in the art.

First, when the mobile device 206 is connected to the network through the first bridge device 202, the first bridge device 202 assigns an identifying number to the context associated with the mobile device 206, Cid, and creates messages A, B, and C. Message A is a nonce which is a first random number, R0, encrypted using the public key of the mobile device 206, via step 402. Message B is R0 and the Cid encrypted using the public key of the first bridge device 202, via step 404. In the preferred embodiment, message B is the mechanism by which the first bridge device 202 associates R0 with Cid without having to maintain its own copy of R0 and Cid. Alternatively, the first bridge device 202 can securely maintain its own copy of R0 and Cid in a storage medium, such as registers or random access memory (RAM). Message C is a digital signature for R0 and Cid, via step 406. In the preferred embodiment, the digital signature is an encrypted hash of R0 and Cid. The messages A, B, and C together comprise the token 208 as created by the first bridge device 202, via step 302 (FIG. 3).

The token 208 is then sent to the mobile device 206, via step 408. The encryption of messages A and B provide secrecy since only the intended recipient can decrypt the messages. The digital signature of message C provides integrity since only the original sender could have created the signature, and the signature will not match if the contents were modified. Therefore, the token 208 is securely provided to the mobile device 206 by the first bridge device 202, via step 304 (FIG. 3).

When the mobile device 206 roams and connects to the second bridge device 204, the mobile device 206 first obtains R0 by decrypting message A using its own private key, via step 410. Only the mobile device 206 can decrypt message A since only it has the private key which matches the public key used to encrypt message A. The mobile device 206 then creates message D by encrypting R0 using the public key of the second bridge device 204, via step 412. Messages D, B, and C together now comprise the token 208. This token 208 is sent to the second bridge device 204, via step 414. The encryption of the messages D and B provide secrecy, and the digital signature of message C provides integrity. Therefore, the token 208 is securely provided to the second bridge device 204 by the mobile device 206, via step 306 (FIG. 3).

The second bridge device 204 obtains R0 by decrypting message D using its own private key, via step 416. The second bridge device 204 can decrypt message D since only it has the private key which matches the public key used to encrypt message D. The second bridge device 204 then creates message E, which is a new nonce which is a second random number, R1, encrypted using R0, via step 418. The second bridge device 204 also creates message F, which is R1 encrypted using the public key of the first bridge device 202, via step 420. Messages E, F, B, and C together now comprise the token 208. This token 208 is sent to the first bridge device 204, via step 422. The encryption of message E provides both secrecy and integrity, as described further below. The encryption of messages F and B also provide secrecy. The digital signature in message C provides integrity. Therefore, the token 208 is securely provided to the first bridge device 202 by the second bridge device 204, via step 308 (FIG. 3).

The first bridge device 202 recovers R1' by decrypting message F using its own private key, via step 424. R1' is the R1 recovered from message F. The first bridge device 202 then recovers its own version of R0 and Cid by decrypting message B using its own private key, via step 426. Only the first bridge device 202 can decrypt messages F and B because only it has the private key that matches the public key used to encrypt the messages. The first bridge device 202 also obtains R1 by decrypting message E using R0 obtained from message B, via step 428. If R1'=R1, via step 430, then the origin of token 208 from the second bridge device 204 is verified. R1' will equal R1 only if the R0 used to encrypt message E is the same as the first bridge device's version of R0. The first bridge device 202 knows that only it and the mobile device 206 had knowledge of R0. Thus, for the second bridge device 204 to be able to successfully encrypt message E with R0, it must have obtained R0 from the mobile device 206. The first bridge device 202 also verifies the digital signature in message C, via step 432. By verifying that R1'=R1 and verifying the digital signature, the token 208 from the second bridge device 204 is authenticated, via step 310 (FIG. 3). The second bridge device's 204 authority to act as the mobile device's 206 agent is thus established.

The first bridge device 202 then encrypts the context identified by Cid, i.e., the context associated with the mobile device 206, using R1, via step 434. The encrypted context is sent to the second bridge device 204, via step 436. The encryption of the context provides secrecy. Because only the first 202 and the second 204 bridge devices have knowledge of R1, encryption of the context with R1 also provides integrity. Therefore, the context is securely sent to the second bridge device 204, via step 312 (FIG. 3).

The second bridge device 204 decrypts the context using its own copy of R1. The context is used to properly connect the mobile device 206 to the network at its new location. The second bridge device 204 then becomes the new first bridge device, creates a new token associated with the mobile device 206, and securely provides the new token to the mobile device 206.

An improved method for roaming in a network environment has been disclosed. The method utilizes a token created by a first bridge device. The token comprises an identity of a context associated with the mobile device when the mobile device is connected to the network through the first bridge device. The first bridge device creates the token and securely provides it to the mobile device. When the mobile device roams to a new location comprising a second bridge device in the network, the token is securely provided to the second bridge device. The second bridge device uses the token to establish to the first bridge device that it is a genuine agent of the mobile device. Once the first bridge authenticates the second bridge device's authority, it securely sends the context associated with the mobile device to the second bridge device. The second bridge device uses the context to properly connect the mobile device to the network at its new location. In this manner, secure roaming within a bridged network is provided.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for roaming in a network environment, the network environment comprising a first bridge device at a first location, a second bridge device at a second location, and a mobile device which roams from the first location to the second location, comprising the steps of:
   (a) creating a token by the first bridge device, wherein the token comprises an identity of a context associated with the mobile device, wherein creating the token by the first bridge device comprises:
      (a1) creating a first message by the first bridge device, wherein the first message comprises a first random number encrypted using a public key of the mobile device; and
      (a2) creating a second message by the first bridge device, wherein the second message comprises a digital signature for the first random number and the identity, and wherein the digital signature is an encrypted hash of the first random number and the identity;
   (b) securely providing the token to the mobile device by the first bridge device, wherein the token securely provided to the mobile device by the first bridge device comprises the first message and the second message;
   (c) securely providing the token to the second bridge device by the mobile device;
   (d) securely providing the token to the first bridge device by the second bridge device;
   (e) determining if the token from the second bridge device is authentic by the first bridge device; and
   (f) securely providing the context to the second bridge device by the first bridge device, if the token from the second bridge device is authentic.

2. A method for roaming in a network environment, the network environment comprising a first bridge device at a first location, a second bridge device at a second location, and a mobile device which roams from the first location to the second location, comprising the steps of:
   (a) creating a token by the first bridge device, wherein the token comprises an identity of a context associated with the mobile device, wherein creating the token by the first bridge device comprises:
      (a1) creating a first message by the first bridge device, wherein the first message comprises a first random number encrypted using a public key of the mobile device;
      (a2) creating a second message by the first bridge device, wherein the second message comprises a digital signature for the first random number and the identity; and
      (a3) creating a third message by the first bridge device, wherein the third message comprises the first random number and the identity encrypted using a public key of the first bridge device;
   (b) securely providing the token to the mobile device by the first bridge device, wherein the token securely provided to the mobile device by the first bridge device comprises the first message, the second message, and the third message;
   (c) securely providing the token to the second bridge device by the mobile device;
   (d) securely providing the token to the first bridge device by the second bridge device;
   (e) determining if the token from the second bridge device is authentic by the first bridge device; and
   (f) securely providing the context to the second bridge device by the first bridge device, if the token from the second bridge device is authentic.

3. A method for roaming in a network environment, the network environment comprising a first bridge device at a first location, a second bridge device at a second location, and a mobile device which roams from the first location to the second location, comprising the steps of:
   (a) creating a token by the first bridge device, wherein the token comprises an identity of a context associated with the mobile device;
   (b) securely providing the token to the mobile device by the first bridge device;
   (e) securely providing the token to the second bridge device by the mobile device, wherein securely providing the token to the second bridge device comprises:
      (c1) obtaining a first random number by the mobile device by decrypting a first message of the token securely provided to the mobile device by the first bridge device using a private key of the mobile device; and
      (c2) creating a fourth message by the mobile device, wherein the fourth message comprises the first random number encrypted using a public key of the second bridge device, wherein the token securely provided to the second bridge device by the mobile device comprises the fourth message and a second message;
   (d) securely providing the token to the first bridge device by the second bridge device;
   (e) determining if the token from the second bridge device is authentic by the first bridge device; and (f) securely providing the context to the second bridge device by the first bridge device, if the token from the second bridge device is authentic.

4. The method of claim 3, wherein the first message was created by the first bridge device, wherein the first message comprises the first random number encrypted using a public key of the mobile device.

5. The method of claim 3, wherein the second message was created by the first bridge device, wherein the second message comprises a digital signature for the first random number and the identity.

6. The method of claim 3, wherein the token securely provided to the second bridge device by the mobile device further comprises a third message, wherein the third message was created by the first bridge device, wherein the third message comprises the first random number and the identity encrypted using a public key of the first bridge device.

7. A method for roaming in a network environment, the network environment comprising a first bridge device at a first location, a second bridge device at a second location, and a mobile device which roams from the first location to the second location, comprising the steps of:
 (a) creating a token by the first bridge device, wherein the token comprises an identity of a context associated with the mobile device;
 (b) securely providing the token to the mobile device by the first bridge device;
 (c) securely providing the token to the second bridge device by the mobile device;
 (d) securely providing the token to the first bridge device by the second bridge device, wherein securely providing the token to the first bridge device by the second bridge device comprises:
  (d1) obtaining a first random number by the second bridge device by decrypting a fourth message of the token securely provided to the second bridge device by the mobile device using a private key of the second bridge device;
  (d2) creating a fifth message by the second bridge device, wherein the fifth message comprises a second random number encrypted using the first random number; and
  (d3) creating a sixth message by the second bridge device, wherein the sixth message comprises the second random number encrypted using a public key of the first bridge device, wherein the token securely provided to the first bridge device by the second bridge device comprises the fifth message, the sixth message, and a second message;
 (e) determining if the token from the second bridge device is authentic by the first bridge device; and
 (f) securely providing the context to the second bridge device by the first bridge device, if the token from the second bridge device is authentic.

8. The method of claim 7, wherein the fourth message was created by the mobile device, wherein the fourth message comprises the first random number encrypted using a public key of the second bridge device.

9. The method of claim 7, wherein the second message was created by the first bridge device, wherein the second message comprises a digital signature for the first random number and the identity.

10. A method for roaming in a network environment, the network environment comprising a first bridge device at a first location, a second bridge device at a second location, and a mobile device which roams from the first location to the second location, comprising the steps of:
 (a) creating a token by the first bridge device, wherein the token comprises an identity of a context associated with the mobile device;
 (b) securely providing the token to the mobile device by the first bridge device;
 (c) securely providing the token to the second bridge device by the mobile device;
 (d) securely providing the token to the first bridge device by the second bridge device;
 (e) determining if the token from the second bridge device is authentic by the first bridge device, wherein determining if the token from the second bridge device is authentic by the first bridge device comprises:
  (e1) obtaining a second random number by the first bridge device by decrypting a sixth message of the token securely provided to the first bridge device by the second bridge device using a private key of the first bridge device;
  (e2) obtaining the second random number by the first bridge device by decrypting a fifth message of the token securely provided to the first bridge device by the second bridge device using a first random number;
  (e3) determining if the second random number from the sixth message is the same as the second random number from the fifth message; and
  (e4) determining if a digital signature from a second message of the token securely provided to the first bridge device by the second bridge device verifies a source of the token; and
 (f) securely providing the context to the second bridge device by the first bridge device, if the token from the second bridge device is authentic.

11. The method of claim 10, wherein the sixth message was created by the second bridge device, wherein the sixth message comprises the second random number encrypted by the second bridge device using a public key of the first bridge device.

12. The method of claim 10, wherein the fifth message was created by the second bridge device, wherein the fifth message comprises the second random number encrypted using the first random number.

13. The method of claim 10, further comprising:
 (e5) obtaining the first random number and the identity by decrypting a third message of the token securely provided to the first bridge device by the second bridge device using the private key of the first bridge device, wherein the third message was created by the first bridge device, wherein the third message comprises the first random number and the identity encrypted using a public key of the first bridge device.

14. The method of claim 10, further comprising:
 (e5) obtaining the first random number and the identity by the first bridge device from a storage medium.

15. A method for roaming in a network environment, the network environment comprising a first bridge device at a first location, a second bridge device at a second location, and a mobile device which roams from the first location to the second location, comprising the steps of:
 (a) creating a token by the first bridge device, wherein the token comprises an identity of a context associated with the mobile device;
 (b) securely providing the token to the mobile device by the first bridge device;
 (c) securely providing the token to the second bridge device by the mobile device;

(d) securely providing the token to the first bridge device by the second bridge device;

(e) determining if the token from the second bridge device is authentic by the first bridge device; and (f) securely providing the context to the second bridge device by the first bridge device, if the token from the second bridge device is authentic, wherein securely providing the context to the second bridge device by the first bridge device comprises:

(f1) encrypting the context associated with the mobile device by the first bridge device using a second random number obtained from decrypting a sixth message of the token securely provided to the first bridge device by the second bridge device; and (f2) securely sending the encrypted context to the second bridge device.

16. The method of claim 15, wherein the sixth message was created by the second bridge device, wherein the sixth message comprises the second random number encrypted using a public key of the first bridge device.

17. The method of claim 15, further comprising:

(f3) decrypting the context from the first bridge device by the second bridge device using a private key of the second bridge device; and (f4) creating a new token by the second bridge device from the decrypted context.

18. A method for roaming in a network environment, the network environment comprising a first bridge device at a first location, a second bridge device at a second location, and a mobile device which roams from the first location to the second location, comprising the steps of:

(a) creating a token by the first bridge device, wherein the token comprises:

a first message comprising a first random number encrypted using a public key of the mobile device, and a second message comprising a digital signature for the first random number and an identity of a context associated with the mobile device;

(b) providing the token to the mobile device by the first bridge device;

(c) decrypting the first message using a private key of the mobile device by the mobile device to obtain the first random number;

(d) creating a fourth message by the mobile device comprising the first random number encrypted using a public key of the second bridge device;

(e) providing a modified token to the second bridge device by the mobile device, wherein the modified token comprises the fourth message and the second message;

(f) decrypting the fourth message using a private key of the second bridge device by the second bridge device to obtain the first random number;

(g) creating a fifth message by the second bridge device comprising a second random number encrypted using the first random number;

(h) creating a sixth message by the second bridge device comprising the second random number encrypted using a public key of the first bridge device;

(i) providing a twice modified token to the first bridge device by the second bridge device, wherein the twice modified token comprises the fifth message, the sixth message, and the second message;

(j) decrypting the sixth message using a private key of the first bridge device by the first bridge device to obtain the second random number;

(k) decrypting a fifth message using the first random number by the first bridge device to obtain the second random number;

(l) determining by the first bridge device if the second random number from the sixth message is the same as the second random number from the fifth message;

(m) determining by the first bridge device if the digital signature from the second message verifies a source of the twice modified token;

(n) encrypting the context of the identity by the first bridge device using the second random number, if the second random number from the sixth message is the same as the second random number from the fifth message and if the digital signature from the second message verifies the source of the twice modified token; and (o) providing the encrypted context to the second bridge device by the first bridge device.

19. The method of claim 18, wherein the digital signature is an encrypted hash of the first random number and the identity.

20. The method of claim 18, wherein the token created by the first bridge device further comprises a third message comprising the first random number and the identity encrypted using the public key of the first bridge device.

21. The method of claim 18, wherein the creating step (a) further comprises:

(a1) storing the first random number and the identity in a storage medium by the first bridge device.

22. The method of claim 18, wherein the modified token further comprises a third message created by the first bridge device, wherein the third message comprises the first random number and the identity encrypted using the public key of the first bridge device.

23. The method of claim 18, wherein the providing step (i) comprises:

(i1) providing the twice modified token to the first bridge device by the second bridge device through at least one intermediary device, wherein the twice modified token comprises the fifth message, the sixth message, and the second message.

24. The method of claim 18, wherein the encrypting step (n) comprises:

(n1) decrypting a third message using the private key of the first bridge device by the first bridge device to obtain the first random number and the identity, wherein the third message was created by the first bridge device by encrypted the third message using the public key of the first bridge device.

25. The method of claim 18, wherein the encrypting step (n) comprises:

(n1) obtaining the first random number and the identity from a storage medium by the first bridge device.

26. The method of claim 18, wherein the providing step (o) comprises:

(o1) providing the encrypted context to the second bridge device by the first bridge device through at least one intermediary device.

27. The method of claims 18, further comprising:

(p) decrypting the encrypted context from the first bridge device by the second bridge device using the private key of the second bridge device; and (q) creating a new token by the second bridge device.

28. The method of claim 18, wherein the context comprises at least one of:

information on how to maintain a status of a port to which the mobile device is connected;

an identity of a virtual LAN to which the mobile device is connected; and information on how to return packets from the mobile device to various locations throughout the LAN.

29. The method of claim 18, wherein the identity of the context is a number.

* * * * *